US011965148B2

(12) United States Patent
Amundsen

(10) Patent No.: US 11,965,148 B2
(45) **Date of Patent: *Apr. 23, 2024**

(54) HVAC/R SYSTEM CONTAMINANT REMOVAL SOLVENT HAVING N-PROPANOL AND FLAME SUPPRESION ADDITIVES, AND METHOD FOR FLUSHING HVAC SYSTEMS USING THE SOLVENT

(71) Applicant: Mainstream Engineering Corporation, Rockledge, FL (US)

(72) Inventor: Ted J. Amundsen, Satellite Beach, FL (US)

(73) Assignee: Mainstream Engineering Corporation, Rockledge, FL (US)

( * ) Notice: Subject to any disclaimer, the term of this patent is extended or adjusted under 35 U.S.C. 154(b) by 116 days.

This patent is subject to a terminal disclaimer.

(21) Appl. No.: 15/839,204

(22) Filed: Dec. 12, 2017

(65) Prior Publication Data

US 2023/0313081 A1 Oct. 5, 2023

Related U.S. Application Data

(62) Division of application No. 15/160,559, filed on May 20, 2016, now Pat. No. 9,873,856.

(51) Int. Cl.

*C11D 3/24* (2006.01)
*C11D 7/28* (2006.01)
*C11D 7/30* (2006.01)
*C11D 7/50* (2006.01)

(52) U.S. Cl.

CPC .............. *C11D 7/5018* (2013.01); *C11D 7/30* (2013.01); *C11D 7/5022* (2013.01)

(58) Field of Classification Search

CPC ......... C11D 3/2006; C11D 3/24; C11D 3/245; C11D 7/261; C11D 7/28; C11D 7/30; C11D 7/5018; C11D 7/5068; C11D 7/5081

See application file for complete search history.

(56) References Cited

U.S. PATENT DOCUMENTS

| | | | | |
|---|---|---|---|---|
| 5,478,492 | A | 12/1995 | Barthelemy et al. | |
| 6,852,684 | B1 * | 2/2005 | Westbrook ............... | C09K 3/30 510/410 |
| 6,951,835 | B1 | 10/2005 | Minor et al. | |
| 8,410,039 | B2 | 4/2013 | Bartelt et al. | |
| 8,557,759 | B2 | 10/2013 | Jernigan | |
| 9,873,856 | B1 * | 1/2018 | Amundsen ........... | C11D 7/5018 |

OTHER PUBLICATIONS

Nu-Calgon Technical Service—Other information This Safety Data Sheet was prepared to comply with the current OSHA Hazard Communication;Standard (HCS) adoption of the Globally Harmonized System of Classification and Labeling of Chemicals (GHS). Issue date Jan. 29, 2015.

DiversiTechPro-Flush Flyer—Flushing Solvents Brochure; DiversiTech Product Development May 18, 2009, DRW, Updated May 18, 2009.

EnSolv NEXT—Preparation Date: May 1, 2015; Identified uses Precision Cleaning Solvent—by Supplier Enviro Tech International, Inc.

Atlantic Chemical & Equipment Co. Inc.—Safety Data Sheet, Issue Date: Feb. 20, 2015 Revision Date: Apr. 6, 2015 Version 1; Product Name APFA1, APFA2 Power Flush II (Aerosol).

DiversiTech Corporation—Safety Data Sheet, SDS# PF-08, PF-16 Total Pages: 6, Date: Oct. 2015. Product: Pro-Flush HVAC Flushing Solvent.

* cited by examiner

*Primary Examiner* — Brian P Mruk

(74) *Attorney, Agent, or Firm* — Michael W. O'Neill, Esq.

(57) ABSTRACT

An aerosolized HVAC/R system solvent for decontaminating HVAC/R components and line sets The solvent contains 25-90 wt % propellant, and 10-75 wt % solvent mixture which is about 60-95 wt % trans-1,2,dichloroethylene, about 5-20 wt % n-propanol, and an inerting constituent providing a weight percent ratio of the inerting constituent to n-propanol of less than 1.5. The solvent is packaged in a container that is connected to the HVAC/R components or line sets to be decontaminated for supplying the solvent mixture under pressure to the HVAC/R components or line sets.

2 Claims, No Drawings

HVAC/R SYSTEM CONTAMINANT REMOVAL SOLVENT HAVING N-PROPANOL AND FLAME SUPPRESION ADDITIVES, AND METHOD FOR FLUSHING HVAC SYSTEMS USING THE SOLVENT

CROSS-REFERENCE TO RELATED APPLICATIONS

This application is a continuation of U.S. patent application Ser. No. 15/160,559, filed on May 20, 2016, now U.S. Pat. No. 9,873,856, and is incorporated by reference herein in its entirety.

BACKGROUND OF THE INVENTION

Chlorofluorocarbons (CFCs) were once widely used solvents for precision cleaning of parts and components due to their superior physical and chemical properties, especially their solvency for contaminating materials such as oils, greases, resin fluxes, particulates, and other contaminates. One solvent commonly used in many applications was CFC-11 (trichlorofluoromethane). CFC-11 has many favorable characteristics such as low toxicity, non-flammability and stability.

The use of CFC-11, however, has become restricted due to its ability to react and deplete atmospheric ozone. By the mid-1980s, problems regarding the ozone became apparent, and the primary culprits were identified as certain halogenated hydrocarbons including CFC-11. Thus, non-toxic and non-ozone depleting replacement solvents became a priority for cleaning applications, Various CFC-11 substitutes have emerged but they do not clean as well, are flammable, or have other drawbacks.

Many factors are important when selecting CFC second-generation replacement solvents. Some of the critical performance properties of CFC replacements include: cleaning effectiveness or solvency; volatility (e.g., boiling point), compatibility with materials to be cleaned (e.g. metals, elastomers and systems), toxicity, environmental persistence, flammability, cost and availability.

The purpose of flushing line sets in HVAC/R systems is to remove acid, moisture, contaminates and oil from the line-sets that are being used after a system failure or when the indoor and outdoor components of the air conditioner are being replaced and the line-set is being reused. A contaminated refrigeration or air conditioning system may have drastically reduced life resulting from compressor failure, for example. The materials and contaminants in these systems differ from other applications and therefore solvents must be optimized accordingly. For example, a flushing solvent must be compatible with the elastomers and metals in typical systems, while at the same time have the solvency properties to remove oils, acids, moisture and decomposition products of the oils and refrigerants. While many solvents can dissolve oil, it is far more important to also remove acid and moisture in HVAC/R systems.

In spite of the fact that the most critical performance metrics for a refrigeration system flush are moisture and acid absorption capacities, typical refrigeration flushes only remove oil. A common EPA SNAP-approved flushing solvent, trans-dichloroethylene (t-DCE), is miscible with mineral oil. Mineral oil is a typical contaminant in an HVAC/R system when the system is converted from R-22 to a newer refrigerant such as R-410A. While t-DCE will strongly absorb mineral oil, it. has low absorption capacities for moisture and strong acids, the latter being present in large numbers in a system after a compressor burnout. Any vapor compression refrigeration or air conditioning system flushing agent should also be nonflammable when dispensed in an aerosol form as determined by ASTM D3065-01. However, t-DCE itself is flammable, and therefore requires non-flammable co-solvents and/or propellants to pass this flammability test.

Hydrofluoroethers have recently gained traction as working fluids for a number of applications due to their low global warming potential (GWP) and zero ozone depletion potential (ODP). They can also be engineered to be non-flammable and nontoxic. Specifically, methoxytridecafluoroheptene isomers (MFHs) have been shown to be miscible with t-DCE so that they can be used as blending agents in solvent applications, as taught in U.S. Pat. No. 8,410,039. They also have low GWP and zero ODP. The addition of MFHs to t-DCE can be made to result in an azeotropic or near azeotropic mixture that does not have a measurable closed cup flash point (e.g., Chemours Vertrel™/Opteon-™Sion™). The acid and moisture absorption capacities of the resulting binary t-DCE/MFHs mixtures are, however, still relatively poor.

Hydrofluorocarbons (HFCs) can also be used to inhibit the flammability of t-DCE. One particular HFC for inhibiting flammability is 1,1,1,3,3,-pentafluorobutane (HFC-365mcf). A mixture of t-DCE and HFC-365mfc is disclosed in U.S. Pat. No. 5,478,492 where compositions were at least 56% by weight of HFC-365mcf. Methyl nonafluorobutyl ether isomers (e.g., Novec™ 7100 by 3M) can also be added to t-DCE/HFC-365mfc mixtures to further refine the flammability and performance trade-offs as taught in U.S. Pat. No. 6,951,835, EnSolv® NEXT by Enviro Tech it one such solvent mixture of t-DCE, HFC-365mfc and methyl nonafluoroisobutly ether (MFBE) where the major component is t-DCE. The published Safety Data Sheet (SDS) indicates ranges of 70-90 wt % t-DCE and 15-25 wt % HFC-365mfc and 1-10 wt % MFBE EnSolv® NEXT.

The solvencies of HFC-365mfc and HFEs are generally poorer than t-DCE due to their lower Kauri-Butanol (KB) values (12 and 10 for HFC-365mfc and MFBE, respectively, compared to 117 for t-DCE). However, HFC-365mfc (F/H mole ratio=1) has a better KB value compared to other inciting HFCs with higher F/H mole ratios (e.g. greater than 1.6) such as HFC-43-10mee (KB=9). Therefore, HFC-365mfc is more desirable than HFC-43-10mee in terms of cleaning capacity. HFC-43-10mee is taught as an inerting solvent in U.S. Pat. No. 6,852684 at concentrations of 20-45 wt % excluding propellant. A higher KB value generally correlates to a better ability to dissolve hydrocarbon oils and greases, Therefore, higher concentrations of t-DCE than HFC or HFE inerting agents are desirable in cleaning solvents. The formulas taught by U.S. Pat. No. 6,852,684 are limited to 55-75 wt % t-DCE. It is critical, but heretofore unattainable duo to flammability issues, to further increase the amount of t-DCE and/or moisture and acid removal additives in the formula. However, I have discovered a means to significantly increase the KB value of the mixture to provide superior solvency compared to the inciting additives.

A drawback of HFC-365mfc relative to the inerting agents taught in. U.S. Pat. No. 6,852,684 however, is less effective flame suppression, itself having a flash point of -27° C. It is known to form non-flammable mixtures with t-DCE but the flammability characteristics are more complicated than with HFC-43-10mee. EnSolv® NEXT uses a small amount of MFBE to further inert the mixture of t-DCE and HFC- 365mfc. Nevertheless, additional flame mitigation is highly desired for use in aerosol HVAC flushing compositions.

As shown in examples presented below, the addition of the MFHs and/or HFC-365mfc only modestly increases moisture and acid absorption capacities. I have recognized that another way to improve the moisture and acid adsorption is clearly needed. It is important to understand that vapor compression air conditioning, refrigerant and similar systems are sealed, pressurized and relatively-clean systems and, while the removal of contaminants and lubricants is important, it is equally as critical to remove residual acid and moisture, since small amounts of the old oil can be tolerated in the new system but moisture and acid can quickly lead to system failure.

Acetone and t-butyl acetate can be used as flushing additives to improve water and acid absorption as taught in U.S. Pat. No. 8,557,759. However, these additives are not as effective as n-propanol as will be shown in the following examples. Acetone is also more expensive than many alcohols, including n-propanol. U.S. Pat. No. 6,852,684 teaches the use of numerous non-azeotropic organic additives with t-DCE to modify solvent properties including alcohols, ketones, esters, siloxanes and ethers. However, they do not suggest using or show data for HFC-365mfc or MFHs as inerting solvents or n-propanol as a property modification solvent for t-DCE. Additionally, all of their flammability test data with ASTM D-3065 appears to have been obtained with 20 wt % propellant in an aerosol formula without ever suggesting aerosols with higher propellant loadings. Table 1 Summary beginning on line 15 of column 9 of U.S. Pat. No. 6,852,684 teaches the minimum amount of inerting solvent required in an aerosol with 20 wt % R-134*a* propellant in order to obtain flame projection less than 18" during ASTM D-3065. This table includes ranges of inerting solvents from 24-42 wt % on a propellant-free basis which corresponds to wt % ratios of inerting solvent/property modification solvent ranging from 1.8-3.2. A key element of my invention is enabling the use of lower inerting solvent/property modification solvent wt % ratios less than 1.5 by including additional propellant beyond 20 wt %. This is highly beneficial because it enables additional productive flammable solvent (t-DCE and/or property modification solvent) to be used in the formula while remaining non-flammable by ASTM D-3065.

Power Flush by Atlantic Chemical & Equipment Company includes 1-9 wt % ethanol in the aerosolized product. However, this formula only includes 50-60 wt % t-DCE. As stated earlier, formulas with more t-DCE are desirable for oil and contaminant cleaning. This formula also uses RFC-43-10mee which is inferior to HFC-365mfc and many HFE inerting agents in terms of cleaning capacity. This formula uses 16-24 wt % HFC-43-10mee, which results in a minimum wt % ratio of inerting solvent/property modification solvent (i.e. HFC43-10mee/ethanol) greater than 1.7. Once again my invention, enables the more desirable use of lower inciting solvent/property modification solvent wt % ratios of less than 1.5 while remaining non-flammable by ASTM D-3065.

A DiversiTech Product Development document lists acetone as the “moisture scavenger” in Pro-Flush™ and ethyl alcohol as the “moisture scavenger” in a Nu-Calgon Corp. product Rx-11. The current formulation of Rx11 on the market is not believed to contain any alcohol based on more recent Nu-Calgon Safety Data Sheets. Previous tests with an earlier formulation containing alcohol were shown to be flammable which may explain why the alcohol was removed.

I discovered a formulation that has excellent acid, moisture and oil cleaning capabilities and yet remains a non-flammable aerosol. That is, I have been able to maximize the percentage of flammable t-DCE ate the formulation while also adding another flammable component n-propanol to dramatically improve the removal of acid and water which, as stated earlier, are critically important impurities to be removed. While the prior art has used ethanol for water removal in other commercial flushes, I have found that although ethanol performs similarly to n-propnol for acid and moisture removal in solution with t-DCE and inerting co-solvents, n-propanol is superior to ethanol in my formulation because it has a higher closed cup flash point (72° F. for n-propanol, 57° F. for ethanol) but similar performance. Because n-propanol is less flammable than ethanol, more n-propanol or t-DCE can be included in the, same formula while remaining non-flammable.

DETAILED DESCRIPTION OF THE INVENTION

The addition of n-propanol to a mixture of t-DCE and MFHs or t-DCE and HFC-365mfc/MFBE results in a solvent with a significantly larger capacity for moisture and acid removal than t-DCE alone, mixtures of t-DCE and MFHs, or mixtures of t-DCE and HFC-365mfc/MFBE. I have also discovered that increasing the flame-suppressing, propellant concentrations in aerosol formulas of t-DCE/MFHs/n-propanol and t-DCE/HFC-365mfc/MFBE/n-propanol beyond 20 wt % enables the use of higher concentrations of t-DCE and/or n-propanol in solution with MFHs and HFC-365mfc/MFBE while maintaining non-flammability by ASTM D-3065. My invention also now enables, via the inerting action of the propellant, the use of inerting solvents With better KR values that would otherwise suffer from flammability issues. The Vertrel™ Sion™ is given a range of 85-97 wt % t-DCE by the manufacturer, and I found the concentration to be approximately 93 wt % by GC-MS. The EnSolv® NEXT is given a range of 70-90 wt % t-DCE by the manufacturer, and I found the concentration to be approximately 90 wt % by GC-MS. My formulas, due to the use of propellant concentrations higher than 20 wt %. contain inerting solvent/property modification solvent wt % ratios of less than 1.5. As above noted, this enables a larger fraction of the solvent mixture to be occupied by productive cleaning components (e.g. t-DCE for oil removal, n-propanol for acid and moisture removal) and less of the liquid solvent being occupied by inerting flame suppressant solvents which do not contribute in a meaningful way to cleaning, Tables 1-3 show the different flushing solvents that went evaluated. The results for moisture removal are shown in Example 1.

TABLE 1

| Composition (wt %) | Sample # |
|---|---|
| 100 t-DCE | 1 |
| 100 Diversitech Pro-Flush ™ | 2 |
| 100 Nu-Calgon Rx-11 | 3 |
| 100 ACE Power Flush | 4 |
| 100 Vertrel ™ Sion ™ | 5 |
| 95 Vertrel ™ Sion ™/5 n-propanol | 6 |
| 90 Vertrel ™ Sion ™/10 n-propanol | 7 |
| 80 Vertrel ™ Sion ™/20 n-propanol | 8 |
| 100 EnSolv ® NEXT | 9 |
| 95 EnSolv ® NEXT/5 n-propanol | 10 |
| 90 EnSolv ® NEXT/10 n-propanol | 11 |
| 80 EnSolv ® NEXT/20 n-propanol | 12 |

TABLE 2

| Composition (wt %) | Sample # |
|---|---|
| 100 Vertrel ™ Sion ™ | 5 |
| 95 Vertrel ™ Sion ™/5 n-propanol | 6 |
| 90 Vertrel ™ Sion ™/10 n-propanol | 7 |
| 80 Vertrel ™ Sion ™/20 n-propanol | 8 |

TABLE 3

| Composition (wt %) | Sample # |
|---|---|
| 100 EnSolv ® NEXT | 9 |
| 95 EnSolv ® NEXT/5 n-propanol | 10 |
| 90 EnSolv ® NEXT/10 n-propanol | 11 |
| 80 EnSolv ® NEXT/20 n-propanol | 12 |

Example 1

2.5 g of denied water was added to 25 g of solvent to determine the moisture absorption capacity. The sample was swirled and allowed to phase separate before drawing from the organic layer for moisture analysis. 0.1 ml of solvent was it into a Karl Fischer titrator to determine the amount of moisture absorbed.

| Sample # | Moisture in Solvent (ppm) |
|---|---|
| 1 | 400 |
| 2 | 4000 |
| 3 | 650 |
| 4 | 2200 |
| 5 | 460 |
| 6 | 1210 |
| 7 | 5600 |
| 8 | 17590 |
| 9 | 620 |
| 10 | 1160 |
| 11 | 6300 |
| 12 | 18550 |

As can be seen in this example, the addition of the MFHs or HFC-365mfc/MFBE into the flushing mixture had little effect on moisture absorption; however, the addition of the 5-20% (by weight) n-propanol (Samples ##6-8 and 10-12) made an unexpected and dramatic increase in the moisture absorption capability of the cleaning mixture. The mixtures of either Vertrel™ Sion™ or EnSolv® NEXT with at least 10 wt % n-propanol are also superior to other line-set flushes on the market. Even with polar additives of acetone and butyl-acetate, Sample #2 is still significantly less effective than my formulas (Samples ##7-8 and 11-12) for removing moisture. Sample #4 discloses 1-11 wt % ethanol in their SDS, however, it is not as effective as n-propanol at about 10-20 wt % in my formulas.

Strong acids are also important contributors to compressor failure in HVAC/R systems. Another unexpected result that I discovered was that the addition of the n-propanol dramatically increased the amount of acid absorbed when compared to the acid absorption of t-DCE alone, mixtures of t-DCE and MFHs or mixtures of t-DCE and HFC-365mfc/MFBE. Example 2 shows the results of my acid testing.

Example 2

86µl wt % HCl in water was added to 20 g of solvent. The samples listed above in Table 1 were swirled and allowed to phase separate if necessary. 5 mL of the organic layer was titrated with a Mettler Toledo DL 70 automatic titrator.

| Sample # | HCl in Solvent (mg/L) |
|---|---|
| 1 | 40 |
| 2 | 174 |
| 3 | 42 |
| 4 | 2000 |
| 5 | 91 |
| 6 | 1830 |
| 7 | 1863 |
| 8 | 2079 |
| 9 | 50 |
| 10 | 1380 |
| 11 | 1813 |
| 12 | 1929 |

As can be seen in Example 2, the addition of the MFHs or HFC-365mfc/MFBE into the flushing mixture had a negligible impact on acid absorption; however, the addition of 2-20 wt % propanol made an unexpected and far more significant increase in the acid absorption capability of the resulting cleaning mixture. The mixtures of either Vertrel™ Sion™ or EnSolv® NEXT with at least 10 wt % propanol are also superior to or on-par with other line-set flushes on the market. Even with polar additives of acetone and butyl-acetate, Samples #2 is still significantly less effective than my formulas (Samples ##6-8 and 10-12) with n-propanol for removing acid. The ethanol in sample #4 is effective in removing acid, but is not as effective as propanol in removing moisture in my formulas. Commercially available flushes also have lower amounts of t-DCE than my samples.

t-DCE has a dosed cup flash point of 6° C. This is highly flammable and unacceptable for use as a cleaning solvent in many applications including cleaning air conditioning and refrigeration components, since a brazing torch will most likely he used to connect these components. Adding approximately 3.5 wt % MFHs to t-DCE results in a formula with no measurable closed cup flash point according to U.S. Pat. No. 8,410,039. Safety Data Sheets for EnSolv® NEXT also indicate that the addition of HFC-365mfc/MFBE to t-DCE results in a solvent with no closed cup flash point, Since many alcohols are flammable, it was unexpected that ternary mixtures of t-DCE, MFHs, and, n-propanol would be non-flammable. For instance, n-propanol has a flash point of 22° C. However, I found that a ternary mixture of 77.2 wt % t-DCE, 2.8 wt % MFHs, and 20 wt % n-propanol was non-flammable with a substantially higher flash point of 45° C. Since the n-propanol provides an unexpected and dramatic increase in the acid and moisture removal of the ternary mixture of the cleaner, and due to its far lower cost (compared to the other ingredients), it makes a far superior line-set flushing formulation.

One common method of flushing HVAC/R line sets is to use a pressurized solvent canister to administer solvent to the parts needing cleaning. I believe this is the preferred method since, by packaging the mixture in a pressurized can, the introduction of atmospheric air and all the moisture contained in ambient air, is avoided in as much as the value of a cleaner that absorbs moisture is reduced if the cleaner is already saturated with moisture from the air even before it is used. It is also understood that, for readily apparent reasons, the pressurizing propellant itself should be non-flammable, (e.g. R-134*a*) so as not to introduce flammability to the solvent during use. I have discovered that, in addition to being non-flammable itself, R-134*a* has the added advantage of providing flame suppression as a propellant for administering flushing solvents containing flammable additives. I have also found that up to approximately 20 wt % (of liquid solvent) n-propanol can be used in t-DCE/MFHs and t-DCE/HFC-365mfc/MFBE mixtures (with t-DCE at approximately 90 wt %, higher than what is used by competitors) when propelled by 20-30 wt % (of total aerosol mixture) R-134*a* and still remain non-flammable as determined by ASTM D3065-01. Example 3 describes these tests.

Example 3

ASTM D3065-01 was followed. Briefly, a 2 in. flame was generated from a paraffin candle with a 1 in. diameter base. The aerosol dispenser was shaken, inverted, and placed 6 in. from the flame. The liquid solvent was dispensed for 4 seconds and the length of any flame projection was recorded. An aerosol causing the flame to extend 18 in. or longer is deemed flammable. This procedure uses an open/close threaded valve to dispense the aerosol instead of a more typical aerosol nozzle with binary on/off function. This ASTM test is still the most relevant for this application to evaluate flammability of flushing solvent aerosols.

TABLE 4

| R-134a wt % | Vertrel ™ Sion ™ wt % (wt % w/o R-134a) | n-propanol wt % (wt % w/o R-134a) | Flame Extension (in.) |
|---|---|---|---|
| 90 | 9 (90) | 1 (10) | 1 |
| 40 | 54 (90) | 6 (10) | 1 |
| 20 | 72 (90) | 8 (10) | 4 |
| 50 | 42.5 (85) | 7.5 (15) | 1 |
| 40 | 51 (85) | 9 (15) | 1 |
| 30 | 59.5 (85) | 10.5 (15) | 3 |
| 20 | 68 (85) | 12 (15) | 6 |
| 50 | 40 (80) | 10 (20) | 3 |
| 40 | 48 (80) | 12 (20) | >18 |

TABLE 5

| R-1234ze wt % | Vertrel ™ Sion ™ wt % (wt % w/o R-1234ze) | n-propanol wt % (wt % w/o R-1234ze) | Flame Extension (in) |
|---|---|---|---|
| 90 | 9 (90) | 1 (10) | 1 |
| 50 | 45 (90) | 5 (10) | 3 |
| 40 | 54 (90) | 6 (10) | 4 |
| 30 | 63 (90) | 7 (10) | >18 |

TABLE 6

| R-134a wt % | EnSolv ® NEXT wt % (wt % w/o R-134a) | n-propanol wt % (wt % w/o R-134a) | Flame Extension (in) |
|---|---|---|---|
| 90 | 9 (90) | 1 (10) | 1 |
| 40 | 54 (90) | 6 (10) | 3 |
| 30 | 63 (90) | 7 (10) | 3 |
| 45 | 47 (85) | 8 (15) | 1 |
| 40 | 51 (85) | 9 (15) | 1 |
| 35 | 55 (85) | 10 (15) | >18 |
| 60 | 32 (80) | 8 (20) | 1 |
| 50 | 40 (80) | 10 (20) | 1 |
| 40 | 48 (80) | 12 (20) | 4 |

TABLE 7

| R-1234ze wt % | EnSolv ® NEXT wt % (wt % w/o R-1234ze) | n-propanol wt % (wt % w/o R-1234ze) | Flame Extension (in) |
|---|---|---|---|
| 90 | 9 (90) | 1 (10) | 1 |
| 50 | 45 (90) | 5 (10) | 3 |
| 45 | 50 (90) | 5 (10) | 4 |
| 40 | 54 (90) | 6 (10) | >18 |

As can be seen in this example, the addition of the R-134*a* to the formula suppresses flammability when dispensed in an aerosol. The flame generally extends further as the amount of propellant is decreased, however, the aerosol remains non-flammable by ASTM D3065-01 down to about 20-40 wt % propellant depending on the n-propanol concentration with Vertrel™ Sion™ and EnSolv® NEXT. Another key element of my discovery is that the aerosol formulation does not necessitate that the liquid solvent be azeotropic or near-azeotropic. U.S. Pat. Nos. 8,410,039, 6,951,835 and 5,478,492 all teach azeotropic or near-azeotropic compositions. I have discovered that the aerosol does not need to be azeotropic or near-azeotropic because the propellant suppresses flammability during administration of the cleaner even in the presence of up to 20 wt % flammable n-propanol. U.S. Pat. No. 6,852,684 only teaches using 20 wt % propellant for aerosol flammability testing, Furthermore, U.S. Pat. No. 6,852,684 only shows data up to about 13 wt % ethanol on a propellant-free basis. While oxygen-containing solvents are disclosed, the data presented is only for ethanol and methanol. Examples 1 and 2 clearly show that there is a significant benefit to acid and moisture removal using higher n-propanol concentrations. Additionally, U.S. Pat. No. 6,852,684 teaches only using t-DCE in the range of 55-75 wt % in the solvent due to the need for higher amounts of inerting agents needed to suppress flame when limited to only 20 wt % propellant, whereas I have found a formulation that allows significantly higher concentrations of t-DCE and/or n-propanol. Vertrel™ Sion™ and EnSolv® NEXT as tested included approximately 93 and 90 wt % t-DCE, respectively. My formulation results in wt % ratios of inerting solvent/n-propanol less than 1.5, as compared to a minimum ratio of 1.5 taught in U.S. Pat. No. 6,852,684 when using HFC inerting solvents or aerosol Power Flush by Atlantic Chemical & Equipment Company with a minimum ratio greater than 1.7.

I have also found that R-1234ze and R-1234yf which are currently proposed environmentally-friendly non-flammable replacement propellants, as well as other isomers of R-1234 can be used instead of R-134*a*. Other compatible non-flammable environmentally-safer propellants are, of course, contemplated for use with the present invention as they become available.

While I have shown and described a currently preferred embodiment in accordance with my invention, it should be understood that the same is susceptible of further changes and modifications without departing from the scope of my invention. I, therefore, do not intend to be limited to the details shown and described herein but intend to cover all such changes and modifications that are encompassed by the attached claims.

I claim:

1. An aerosolized HVAC/R system solvent for decontaminating HVAC/R components and line sets, comprising 25-90 wt % propellant, and 10-75 wt % solvent mixture, the solvent mixture comprising:

(i) about 60-95 wt % trans-1,2, dichloroethylene;

(ii) about 5-20 wt % n-propanol; and (iii) an inerting constituent selected from the group consisting of hydrofluorocarbons, hydrofluoroethers, and mixtures thereof to provide a weight percent ratio of the inerting constituent to n-propanol of less than 1.5; and wherein the propellant is selected from the group consisting of isomers of R-1234 refrigerant.

2. An aerosolized HVAC/R system solvent for decontaminating HVAC/R components and line sets, comprising 25-90 wt % propellant, and 10-75 wt % solvent mixture, the solvent mixture comprising:

(i) about 60-95 wt % trans-1,2, dichloroethylene;

(ii) about 5-20 wt % n-propanol; and (iii) an inerting constituent selected from the group consisting of hydrofluorocarbons, hydrofluoroethers, and mixtures thereof to provide a weight percent ratio of the inerting constituent to n-propanol of less than or equal to 1.33.

* * * * *